June 27, 1950     R. E. FULTON, JR., ET AL     2,512,928
WHEEL BRAKE CONTROL LINKAGE FOR ROADABLE AIRPLANES
Filed March 3, 1945     5 Sheets—Sheet 1
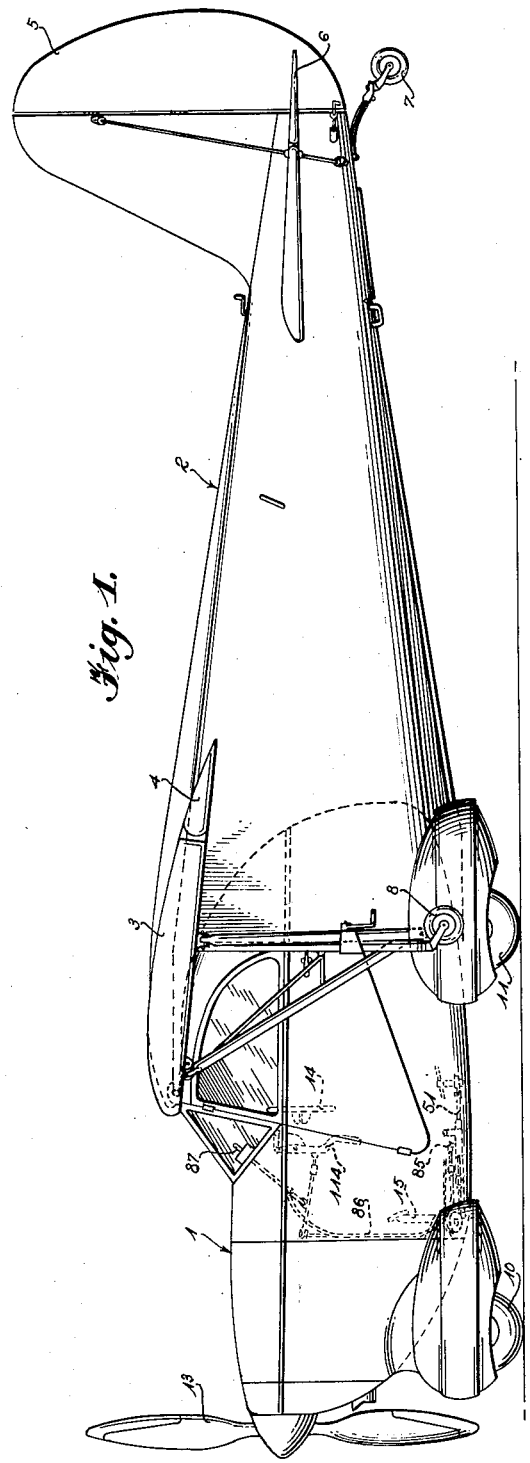
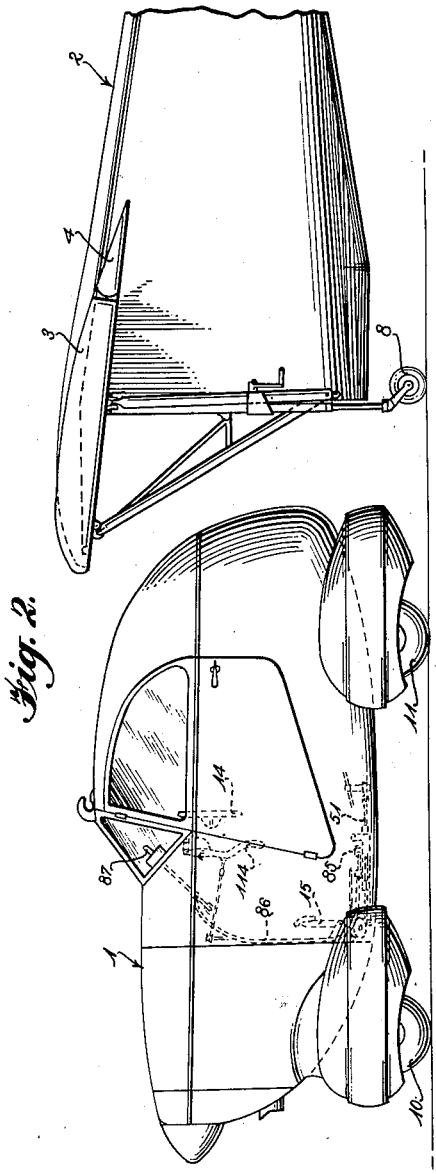
Inventors
Robert E. Fulton, Jr. and
Octavio J. Alvarez
By Stevens and Davis
Attorneys Inventors
Robert E. Fulton, Jr.
and Octavio J. Alvarez
By Stevens and Davis
Attorneys

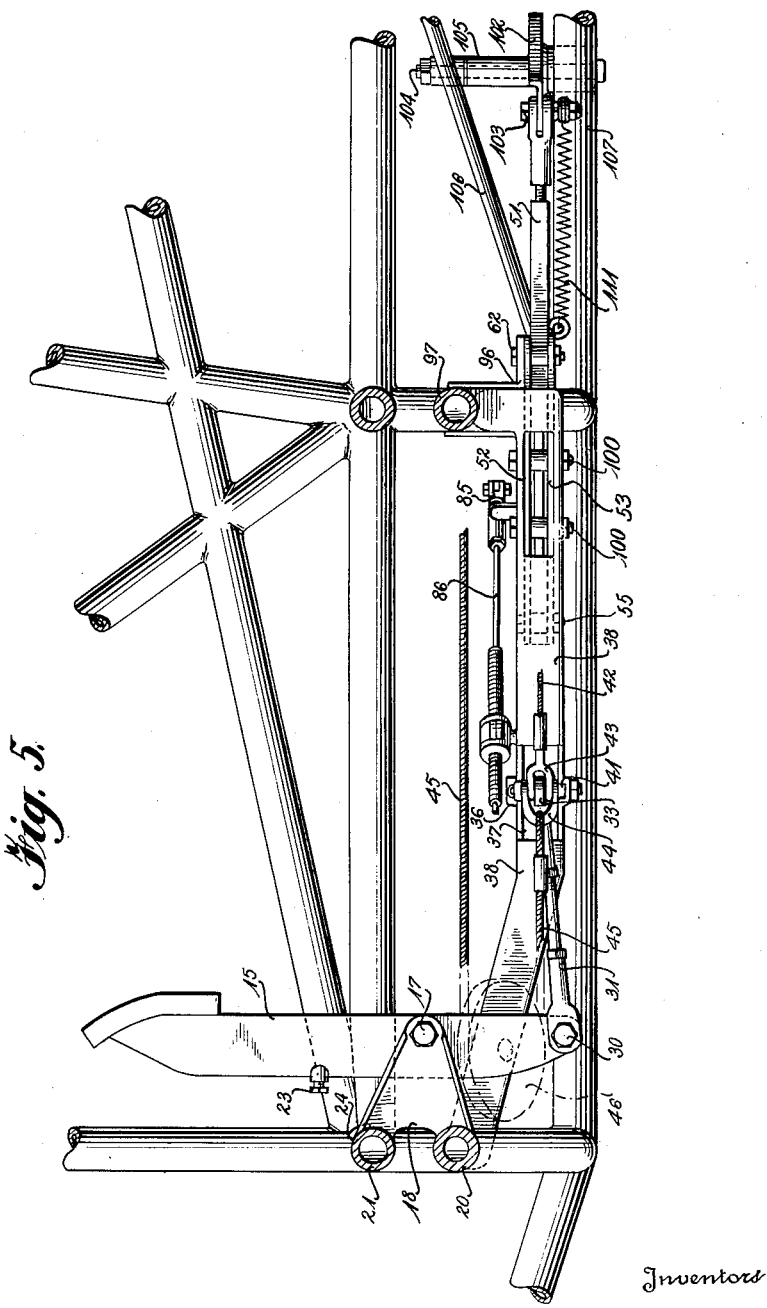

June 27, 1950  R. E. FULTON, JR., ET AL  2,512,928
WHEEL BRAKE CONTROL LINKAGE FOR ROADABLE AIRPLANES
Filed March 3, 1945  5 Sheets-Sheet 4
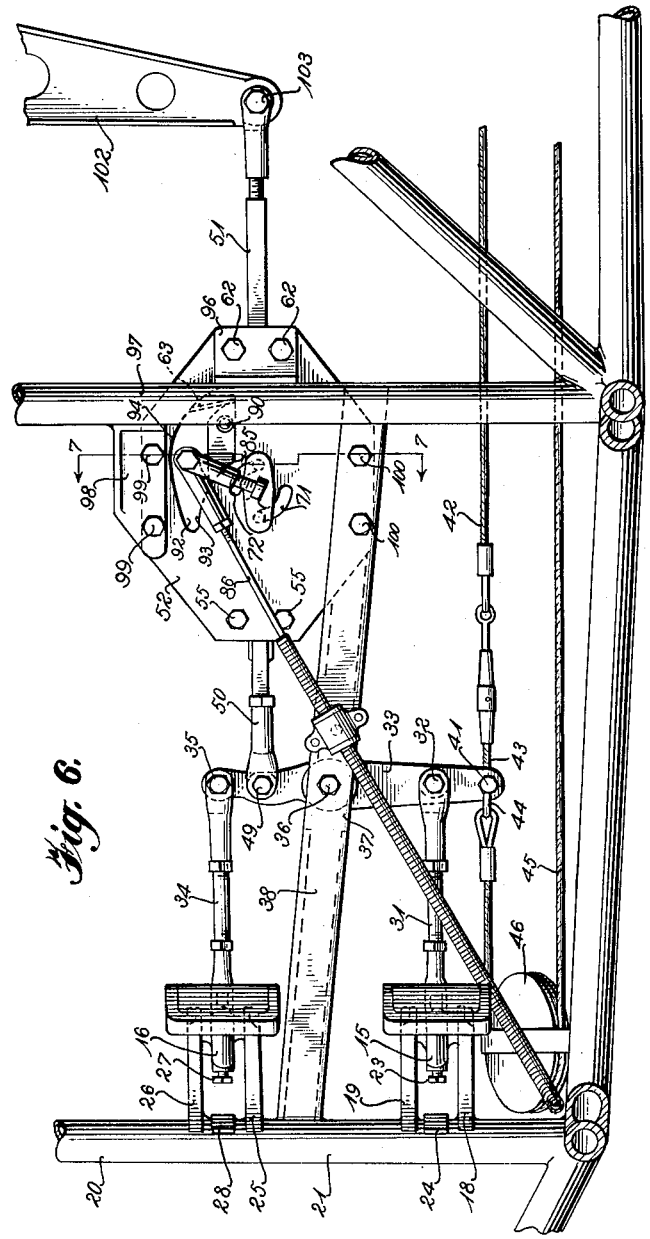
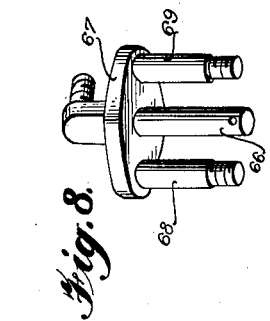
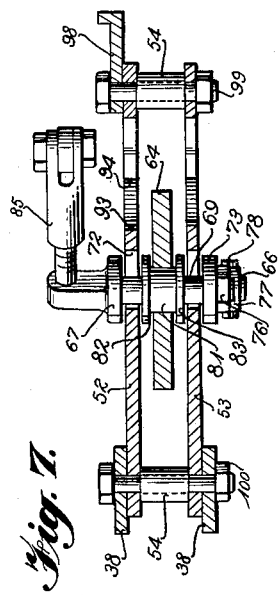
Inventors
Robert E. Fulton, Jr.
and Octavio J. Alvarez
By Stevens and Davis
Attorneys

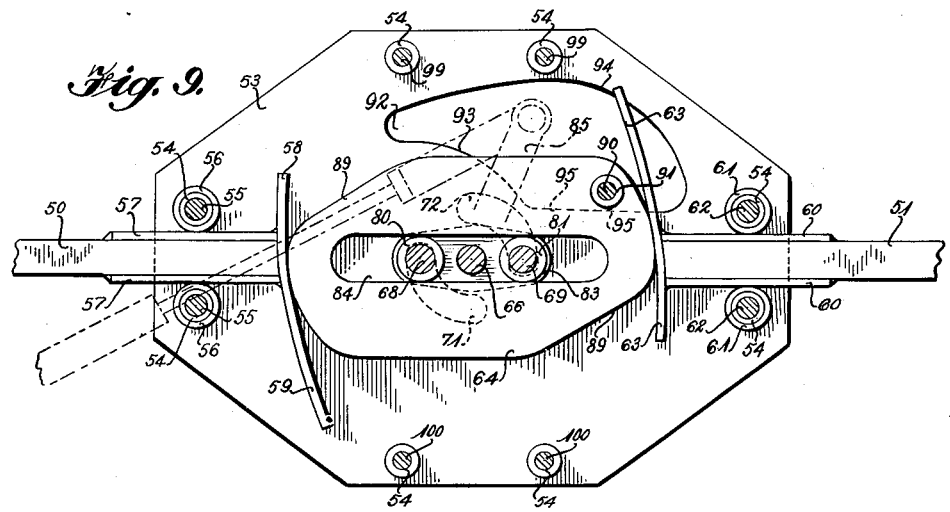
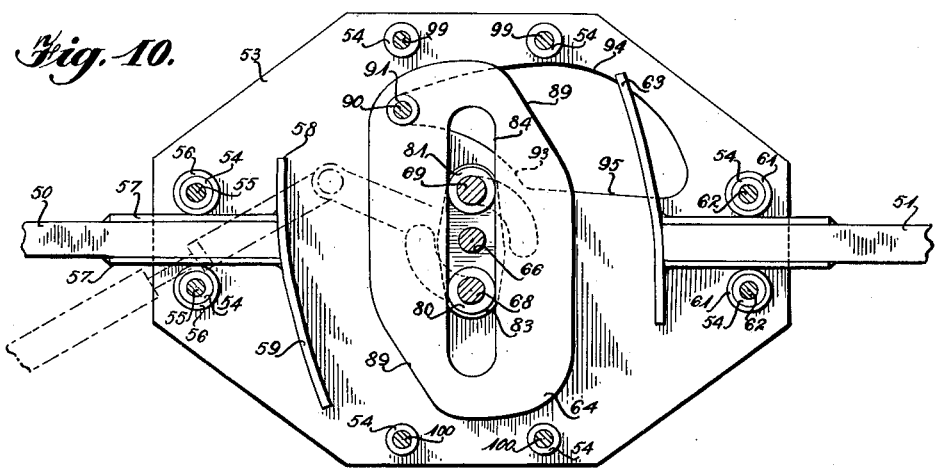
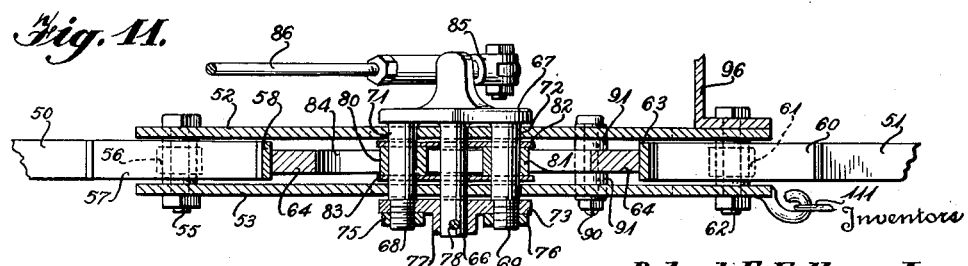

Patented June 27, 1950

2,512,928

UNITED STATES PATENT OFFICE 2,512,928

WHEEL BRAKE CONTROL LINKAGE FOR ROADABLE AIRPLANES

Robert E. Fulton, Jr., Washington, D. C., and Octavio Jose Alvarez, New York, N. Y., assignors to Continental, Incorporated, Washington, D. C., a corporation of Connecticut Application March 3, 1945, Serial No. 580,846

5 Claims. (Cl. 244—2)

This invention relates to a vehicle primarily intended for use as an airplane in which a section containing the power unit and the operator's controls may be separately used as an automobile.

The history of the airplane is almost as old as that of the automobile. Both appeared at approximately the turn of the century. Yet today, almost a half a century later, there are a very large number of automobiles in this country to every one privately owned airplane.

Such a condition is the result of certain basic shortcomings in the airplane. Airplanes require airports to operate. Airports are of necessity located on the outskirts of communities, not infrequently at considerable distance. Thus the time saved by the speed of aerial transportation is more frequently than not consumed by the ground-travel time required to get from the airport to the flier's final destination.

Furthermore, the expense of travel between the airport and the community, usually involving taxis, is not inconsiderable. When to this is added the initial cost and upkeep of the airplane plus that of an automobile which the flier undoubtedly owns as well, it is obvious why few can afford to own an aircraft.

The average automobile ride from point of origin to destination is not over five miles. For every automobile trip of several hundred miles, the average man makes as many as a hundred short local trips. Since he can afford only an automobile or an airplane, his choice is obvious.

This has been the basic factor in retarding widespread public adoption of the airplane in the past and, unless remedied, will have a serious effect on its future. Various endeavors have been made to circumvent the situation. Closer-to-town airports, locally available cars for rent, and other expedients have been offered but they fail to solve the basic practical and economic problems.

While the real cure has been much discussed, little or nothing of a practical nature has been executed to carry it into effect. Obviously there is much in common between an automobile and an airplane. Both have wheels, a body, a cab or cabin, a motor, and controls for starting, guiding and stopping. When a pilot leaves his aircraft at an airport and takes a cab to town he is leaving behind 90% of the basic elements of an automobile—an expensive and unnecessary procedure which has done more than any other thing to stifle aviation.

Others have recognized this fundamental problem and have made efforts to solve it by accomplishing a transition from airplane to car and back. But the problem has many aspects — mechanical, aerodynamic, practical, safety, economy, comfort, service and maintenance, public reaction and acceptance. Of the several suggested solutions which have been offered to date, all have failed due to neglect of one or more of the above features. Most have been so radical in conception and based on such untried principles that they have failed to hold public interest. Others have made contributions which, unless supplemented by many additional features, were of little practical value.

It is an object of this invention to produce a roadable airplane by making a practical combination of already accepted forms and styles of automobile and aircraft designs, thereby making the final unit one of greater public value by virtue of its ready acceptance resulting from its being basically a combination of already familiar elements.

The present invention therefore is concerned with an airplane having a removable section adapted for use as a standard automobile and an airplane section comprised of wings, fuselage and control surfaces, having cooperating interlocking means on the airplane and automobile sections by which the sections may be firmly held together to establish a complete airplane. This interlocking means is not disclosed here as it constitutes no part of the present invention, but a suitable means is disclosed in application Serial No. 580,844 filed herewith.

When the completed airplane is being used for air travel, it should be controllable in the usual manner for airplanes. This includes the provision of foot pedals which may be freely pressed upon by the operator to move the rudder at the tail end of the fuselage. When the automobile section is used alone for road travel however, at least one of the pedals should be useable to control the movement of the automobile in the usual manner. As it is probable that it is of greatest importance from a safety viewpoint that the brakes be operated by the conventionally placed foot pedal, the present invention utilizes this corresponding foot pedal to apply the brakes. It is also important, however, that this pedal be freed of operation of the brakes when the pedals are utilized to move the rudder.

The invention, therefore, involves the provision of foot pedals one of which operates the brakes of the automobile section during road travel, and both of which are utilized to move the rudder of the completed airplane during air travel. When controlling the rudder the pedals are interconnected so that the one moves forwardly as the other moves rearwardly.

As a further safety feature of the invention, the rudder connected to the foot pedals is maintained at all times and it is, therefore, certain that during air travel this connection will be intact. When the airplane section is removed from the automobile section for road travel, the connection to the rudder may be broken or disconnected adjacent to the point of separation between the sections, but in accordance with the invention this will be the only interruption in the connection, as the engagement at the pedals will be maintained constantly.

The invention also involves the provision of means for eliminating the braking action during air travel so that the pressure required to operate the brakes will not have to be exerted during use of the pedals for rudder movement. The two pedals will therefore act under substantially the same foot pressure throughout both ranges of movement in moving the rudder, as the one which is also used to operate the brakes will be fully relieved of this braking action.

As a further feature of the invention, means are provided for quickly and effectively eliminating the braking action from the brake foot pedal, and this means is conveniently manipulatable by the operator.

Another feature of the invention is the provision of means for including or excluding the braking action from the pedal control, which will be positive in its operation. When the brake pedal is coupled to apply the brakes, this coupling will be immutably maintained. Also when the brake pedals are operating only the rudder, the braking system will be maintained incapacitated.

Other features of the invention will be evident from the following description and from the drawings, which disclose a preferred structural embodiment of the invention.

In the drawings:

Figure 1 is a side elevation of the airplane as it appears when the automobile and airplane sections are assembled for flight, certain structural elements of the invention being generally represented by phantom lines;

Figure 2 shows the automobile section removed from the airplane section and the airplane section in its self-sustaining position;

Figure 5 is a side elevation of the foot pedals and their immediate coupling elements;

Figure 6 is a plan view of Figure 5;

Figure 7 is a section on the line 7—7 of Figure 6;

Figure 8 is a perspective of the shifting element in the structure of Figure 7;

Figure 9 is a plan view of the brake linkage coupling device in its coupling position, the cover plate being removed;

Figure 10 is a plan view similar to Figure 9, of the device in its brake uncoupling position; and Figure 11 is a vertical longitudinal view through the brake linkage device in the position of Figure 9.

Figure 3:
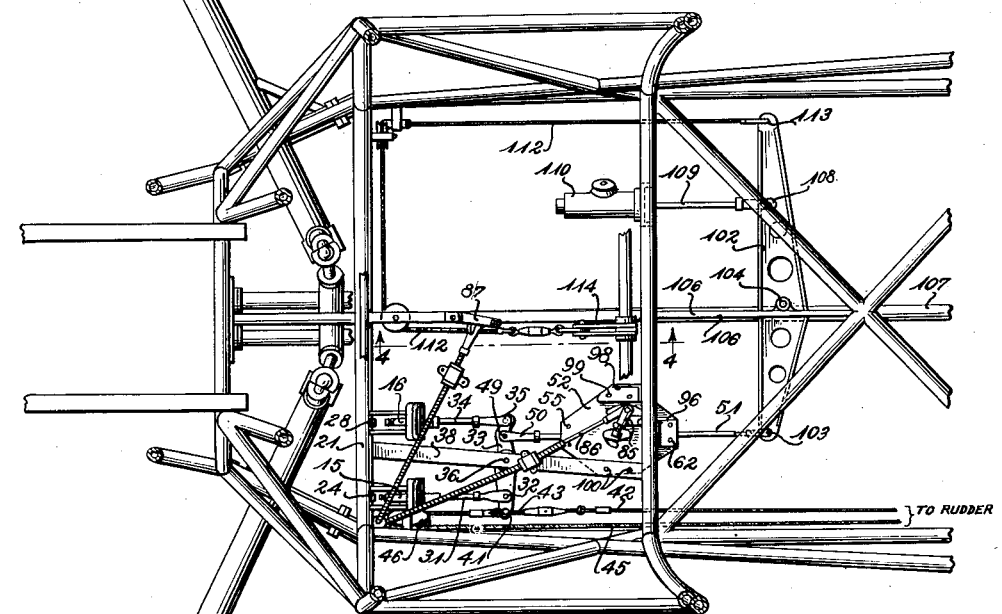
Figure 3 is a plan view of the forward part of the automobile section, certain upper portions being removed to better show the foot pedal and associated systems.
Figure 4:
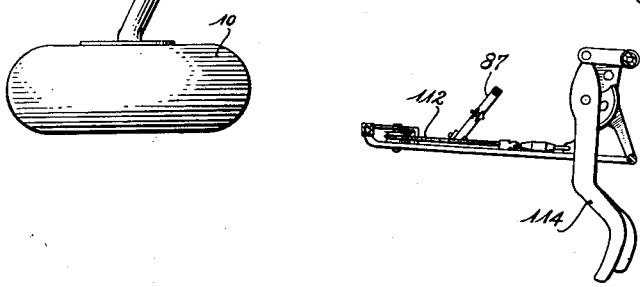
Figure 4 is a section on the line 4—4 of Figure 3.

Referring first to Figure 1, the automobile section 1 of the airplane appears at the left of the vehicle and the airplane section 2 appears at the right of the vehicle. In Figure 1 these two sections are combined for flight and in Figure 2 they are separated from each other so that the automobile section may be driven independently as a unit for road travel. When the automobile section is used as a unit the airplane section 2 is left behind.

The airplane section 2 includes lifting wings 3 at its forward portion and at the trailing edges of these wings are the usual ailerons 4. At the rear of the airplane section are the usual control surfaces and these include the rudder 5 and the elevators 6.

When the airplane section is attached to the automobile section as shown in Figure 1, the airplane section is supported as a cantilever as shown in Figure 1. The means for attaching these sections together and by which the sections may be released from each other constitute no part of the present invention and consequently are not shown in detail, but a suitable means is disclosed in application Serial No. 580,844 filed herewith. When this interconnecting means is released and the sections are separated from each other, the airplane section must be self-supporting and to accomplish this it is provided with the wheel 7 beneath the tail surfaces and the wheels 8 beneath the forward wings.

Just prior to the time that the airplane section is separated from the automobile section, the wheels 7 and 8 are moved downwardly into contact with the ground. The means by which the wheels 7 and 8 are moved downwardly are not a part of the present invention and therefore are not here described in detail, but a suitable means is disclosed in application Serial No. 580,843 filed herewith. These wheels 7 and 8 support the airplane section in the same position which it would occupy if it were attached to the automobile section so that separation of the sections and their reconnection is facilitated.

The automobile section 1 includes the front wheels 10 and the rear wheels 11. It also includes a motor to which the propeller 13 may be attached for air travel, as shown in Figure 1, or from which it may be removed for road travel, as shown in Figure 2. A steering wheel 14 within the cab portion of the automobile section is provided so that the front wheels 10 may be turned to guide the automobile during ground travel or so that certain control surfaces of the airplane section may be moved during air travel. The means by which the operation of the steering wheel produces control for road travel and for air travel is not a part of the present invention. A suitable mechanism of this character is disclosed in application Serial No. 580,847 filed herewith, now U. S. Patent No. 2,457,884, issued on Jan. 4, 1949.

Within the cab and accessible to the operator are foot pedals 15 and 16. During air travel these pedals are operated to move the rudder at the rear end of the airplane section and during road travel, in accordance with the present invention, one of these pedals is utilized to operate the brakes within the wheels 10 and 11.

It may first be explained that during road travel one of these pedals is not required to control a clutch in the automobile. In accordance with the present invention, the driving connection between the motor and the wheels is entirely under the control of the accelerator pedal so that when no pressure is exerted upon this pedal the motor is in effect disconnected from the driving wheels. Pressure upon the accelerator pedal not only establishes a driving connection between the motor and the driving wheels but determines the speed at which the automobile will be driven. However, this control means which is responsive to the accelerator pedal does not constitute a part of the present invention.

The pedal 15 is a lever which is pivoted at a point between its ends about a fulcrum bolt 17 (Fig. 5). The fulcrum bolt 17 is carried at the outer extremities of bracket plates 18 and 19 (Figs. 5 and 6) which are secured to transverse bars 20 and 21 of the automobile section framework and the pedal lever 15 fits closely between the brackets 18 and 19. To limit the forward movement of the pedal, it is provided with an adjustable stop screw 23 (Fig. 5) which may strike against a stop plate 24 secured to the cross bar 21.

The pedal 16 is pivoted in the same manner that pedal 15 is pivoted and this includes bracket plates 25 and 26 (Fig. 6) which are attached to the cross bars 20 and 21. Stop screw 27 and stop plate 28 are provided to limit the forward movement of this pedal.

The lower end of lever 15 is pivoted by bolt 30 to a link 31 (Fig. 6), the other end of this link 31 being pivoted by a pin 32 to a lever 33 (Fig. 6). In like manner, the lower end of the lever 16 is connected by a link 34 to the lever 33 at a pin 35. The links 31 and 34 are adjustable so that their lengths may be varied and when the pedals 15 and 16 are in their mid-positions, the lever 33 should preferably extend in a direction which is substantially parallel to a line joining the pedals as appears from Figure 5.

The lever 33 (Fig. 6) is pivoted at a point midway between pins 32 and 35 by a fulcrum bolt 36. This lever 33 extends through a transverse slot 37 through a hollow square bar 38 which extends longitudinally of the automobile framework. The fulcrum bolt 36 is supported both above and below the lever 33 by the upper and lower remaining walls of the hollow square frame member 38.

The lever 33 and its connection by links 31 and 34 to the pedals 15 and 16, respectively, cause the pedals 15 and 16 to move in unison with each other but in opposite directions. Thus, pressure upon the one pedal in one direction will force the other pedal to have an equal movement but in the opposite direction.

Outwardly beyond the pivot pin 32 from the fulcrum bolt 36 is a pin 41. One end of a cable 42 is attached to pin 41 by a clevis 43 and a clevis 44 also connected to the pin 41 attaches a cable 45 to the lever 33. The cable 45 passes around a sheave 46 supported by the automobile framework. The cables 42 and 45 extend rearwardly and may be connected directly to the rudder 5 or may be connected to a coupling which will permit a quick separation between the automobile and airplane sections.

Movement of the pedal levers 15 and 16 therefore pulls on the cables 42 and 45 to turn the rudder 5 and since the pin 41 has a longer moment arm than do the pivot pins 32 and 35, the movement of the pin 41 is increased. This is desirable in some instances in order to give the cables 42 and 45 an increased movement with respect to the pedal travel.

A link 50 (Fig. 6) is connected by a pin 49 to the lever 33 at a point between the pivot pin 35 and the fulcrum bolt 36. This link 50 extends into a disengageable connecting device which constitutes an important feature of the invention. This disengageable connecting device may either establish a driving connection between the link 50 extending into one end thereof and the link 51 extending out of the opposite end thereof, or may break this connection so that movement of link 50 will not be transmitted to link 51.

The disengageable connection device includes an upper plate 52 and a lower plate 53 (Fig. 10). These plates are separated from each other a fixed distance by spacer collars 54 (Fig. 9) through which clamping bolts pass. Two of these bolts, 55, are on opposite sides of the link 50 and rollers 56 (Figs. 9 and 10) are rotatably mounted upon the collars 54 on these bolts. Bearing plates 57 (Fig. 9) are secured to the opposite sides of link 50 to provide flat surfaces which are in contact with the rollers 56 to provide a guide for the lengthwise movement of the link 50. A pressure plate 58 (Fig. 10) is secured to the end of the link 50 and at its point of attachment to the link 50 it is perpendicular to the link but to one side thereof it is curved as indicated at 59 (Fig. 9).

The link 51 is similarly guided by means of bearing plates 60 (Fig. 9) affixed thereto which bear upon rollers 61 (Figs. 9 and 10) rotatably mounted on the collars 54 of two other securing bolts 62. A pressure plate 63 is secured to the end of the link 51 and has a configuration similar to that of plate 58. It will be noted that the plates 58 and 63 are spaced from each other and are symmetrical about a point centrally between them.

Between the plates 58 and 63 is a generally oblong shaped plate 64. Its longer dimension is such as to bridge the space between the plates 58 and 63 so that pressure from the plate 58 will be transmitted directly to the plate 63, as appears from Figure 9. However, when this plate 64 is turned crosswise to the position of Figure 10 this connection between the plates 58 and 63 will be broken because the narrow width of the plate 64 is then presented between the plates 58 and 63. When the plate 64 is in this position of Figure 10, the plate 58 and the plate 63 may have independent back and forth movement, and movement of the one will not be transmitted to the other.

To turn the plate 64 from the position of Figure 9 to the position of Figure 10, a turning member shown in Figure 8 is provided. This includes a central fulcrum stem 66 which passes through pivot bearing openings in both the upper plate 52 and the lower plate 53. Secured to the upper end of the fulcrum stem 66 and on the outside of the plate 52 is a plate 67 from which project pins 68 and 69. The pins 68 and 69 are parallel to and equidistant from the fulcrum stem 66 and are at diametrically opposite points from each other with respect to the fulcrum stem 66.

The pins 68 and 69 pass through openings 71 and 72 (Fig. 9), respectively, through both the upper plate 52 and the lower plate 53 and these openings 71 and 72 are of arcuate shape to permit the arcuate movement of the pins 68 and 69 when stem 66 is rotated. The arcuate openings 71 and 72 are only long enough to permit a quarter turn of the fulcrum stem 66 and thus serve to limit its rotational movement to the position in Figure 9 in one direction and to the position in Figure 10 in the opposite direction.

A retaining plate 73 (Fig. 7) is carried upon the stem 66 and pins 68 and 69 on their portions which project beyond the lower plate 53. The pins 68 and 69 (Fig. 8) are threaded and these threaded portions are of reduced diameter to provide shoulders against which the plate 73 may be clamped by two nuts 75 and 76. The plate 73 has a central boss 77 (Fig. 11) and a bolt 78 passes through it and the fulcrum stem 66.

Upon the pins 68 and 69 and between the plates 52 and 53 are rollers 80 and 81 (Fig. 11), respectively. These rollers 80 and 81 are spaced from the inner faces of the plates 52 and 53 by means of washers 82 and 83. The plate 64 is formed with a longitudinally extending centrally located slot 84 (Fig. 9) which is only as wide as the outer diameter of the rollers 80 and 81 so that the plate 64 is limited only to lengthwise movement along the rollers 80 and 81. The rollers 80 and 81 when in the position of Figure 9 therefore serve to guide the plate 64 in a lengthwise direction and maintain its position as a connecting bridge between the plates 58 and 63. The plate 64 is also maintained in its position of Figure 9, due to the curvature of portion 59 of plate 58 and the corresponding curved portion of plate 63. This curved portion close to the flat portions of the plates 58 and 63, lies slightly within an arc struck from the center of stem 66 so that there will be a camming action tending to maintain the plate 64 in the position of Figure 9.

Due to the close fit of the rollers 80 and 81 with respect to the width of the slot 84, the plate 64 will be carried by them to the position of Figure 10 upon rotation of the fulcrum stem 66. To turn the fulcrum stem 66 and thereby turn the plate 64 to the position of Figure 9 or Figure 10, an adjustable arm 85 (Fig. 7) is affixed to the plate 67. A Bowden wire 86 (Fig. 6) is connected to the outer end of the arm 85 and this Bowden wire extends upwardly to a point within the automobile cab to be accessible to the operator. As here shown, the end of the wire 86 is connected to a manually operable lever 87 (Figs. 1 and 2) within reach of the operator. This lever is more fully disclosed in application Serial No. 580,845 filed herewith now U. S. Patent No. 2,509,095, issued on May 23, 1950. Movement of this lever back and forth causes the arm 85 to move and thereby turn the plate 64 to the position either to establish or break the connection between the links 50 and 51.

When the plate 64 is in the position of Figure 10 it is preferable that the plate 64 be maintained in a substantially symmetrical position with respect to the rollers 80 and 81. This is desirable because if the plate 64 moves endwise so that the roller 80 or 81 is at its respective end of the slot 84, it will be difficult to turn the plate 64 from the crosswise position to the position of Figure 9 since one end of the plate 64 will first come into contact with its respective plate 58 or 63. Under these conditions, in addition to the force required to turn the plate 64 to the position of Figure 9, force will have to be exerted to shift the plate 64 lengthwise under the camming action of its end as it moves along the plate 58 or 63 with which it is in contact.

However, if the plate 64 is in the symmetrical position of Figure 10 rotation of the plate 64 toward the position of Figure 9 will cause its two ends uniformly to approach the plates 58 and 63, and the plate 64 will move freely into the position of Figure 9. Any slight displacement of the plate 64 from a symmetrical position as the position of Figure 9 is approached, will be accommodated by the curvature of the portion 59 of plate 58 and the corresponding curved portion of plate 63. Also, the sloping faces 89 of plate 64 serve to guide the plate into position between the pressure plates 58 and 63.

To cause this symmetrical position of plate 64 when in the position of Figure 10, a bolt 90 (Fig. 10) is provided, which passes through the plate 64 and secures rollers 91 to its opposite sides. Openings are formed in the plates 52 and 53 to receive these rollers 91 and at one end of these openings they are reduced in size to a notch 92 (Fig. 9) which is of substantially the same size as the rollers 91. These notches 92 are so positioned that when the plate 64 is in the position of Figure 10 and rollers 91 are in the notches, the plate 64 will be held in the desired symmetrical position.

From this notch 92 the sides 93 and 94 of the openings are curved to serve as guides to direct the rollers 91 into the notch 92 from whatever lengthwise position the plate 64 may have when it is disposed lengthwise between the plates 58 and 63 as in Figure 9. The curved surfaces 93 and 94 are joined by an edge 95 which is substantially parallel to the lengthwise movement of the plate 64 when in the position of Figure 9 and is sufficiently long to permit movement of the rollers 91 to the extremities of the positions to which they are carried by the plate 64.

To support the disengageable connecting devices at its rear end, it is attached by a bracket 96 (Fig. 5) secured beneath the bolts 62, to a cross bar 97 of the automobile framework. A bracket 98 (Fig. 6) also attached to the cross bar 97 is secured to the disengageable connecting device by bolts 99. Opposite from the bracket 98 the device fits in between the upper and lower walls of the hollow square bar 38 of the machine framework and is attached thereto by bolts 100.

The link 51 is connected to one end of a lever 102 (Figs. 3 and 5) by a pivot pin 103. This lever 102 is pivoted upon a fulcrum bolt 104 which passes through a boss 105 (Fig. 5) secured to the lever 102. The fulcrum bolt 104 is secured at both its upper and lower ends to the framework bars 106, 107. On the opposite side of the fulcrum bolt 104 from the pivot pin 103, a pivot pin 108 (Fig. 3) connects a push rod 109 to the lever 102. This push rod 109 extends into a pressure cylinder 110 which delivers fluid to apply the brakes. A tension spring 111 (Fig. 5) serves to withdraw the push rod 109 from the cylinder 110.

Beyond the pin 108 a cable 112 is attached to the lever 102 at a pivot pin 113 (Fig. 3) and this cable 112 extends upwardly to a hand brake lever 114 (Fig. 3). The brake lever 114 is of a conventional type which may be locked in position by a hand releasable ratchet. When the hand brake is applied it draws on the cable 112 and forces the push rod 109 toward the pressure cylinder 110 to apply the brakes in the same manner that this is performed by pressure of the link 51 against the opposite end of the lever 102.

Operation of the hand lever 114 to apply the brakes is not interfered with by the connections to the foot pedal since the plate 63 is merely drawn away from the plate 64 and no resistance is offered to such movement and this is true irrespective of whether the plate is in the position of Figure 9 or 10. When the foot pedal is pressed upon to apply the brakes, movement of the lever 102 merely causes a slackening of the cable 112 and consequently the connection to the hand lever 114 offers no resistance to such movement.

It is important to note that the brakes may always be applied by the hand lever 114. When the plate 64 has been moved to the position of Figure 9, the brakes may also be applied by foot pressure upon the pedal 16, this connection being established by the plate 64. When the plate 64 is moved to the position of Figure 10, it breaks the connection to the brake mechanism so that the link 59 has a lost-motion and no resistance is offered by the brake mechanism to its free movement.

It is also important to note regardless of the position of the plate 64, the foot pedals are always permanently connected to the rudder cables. This is an important safety feature in that it completely eliminates any danger of the airplane being taken off the ground with the rudder controls out of operation.

What is claimed is:

1. In a roadable airplane including an automobile section which may be removed from an airplane section, said automobile section comprising a power unit, wheels for road travel and a brake mechanism, and said airplane section comprising lifting wings and control surfaces including a rudder, the combination in said automobile section of a pair of foot pedals pivoted to receive foot pressure, an interconnection between said pedals so that the one will be moved by the other in the opposite direction, an attachment to said pedals for connection to the rudder to cause its movement, and a connection from one of said pedals to exert a pushing force upon the brake mechanism to apply the brakes, said last named connection including a bridging member longer than wide and disposable in a lengthwise position to transmit the pushing force to the brake mechanism or disposable in a crosswise position to break the application of said pushing force to the brake mechanism.

2. In a roadable airplane including an automobile section which may be removed from an airplane section, said automobile section comprising a power unit, wheels for road travel and a brake mechanism, and said airplane section comprising lifting wings and control surfaces including a rudder, the combination in said automobile section of a pair of foot pedals pivoted to receive foot pressure, an attachment to said pedals for connection to the rudder to cause its movement, and a connection to one of said pedals to exert a pushing force upon the brake mechanism to apply the brakes, said last named connection including a bridging member longer than wide and having a longitudinal slot therethrough, and a shifting member located in said slot to dispose the bridging member in a lengthwise position to transmit the pushing force to the brake mechanism or to dispose it in a crosswise position to break the application of said pushing force to the brake mechanism, said shifting member serving as a guide within the slot to maintain the bridging member in its lengthwise position.

3. In an automobile section which may be connected to an airplane section having lifting and control surfaces to form an airplane, the combination of a pair of foot pedals, a connection to the pedals for operating engagement with a control surface of the airplane section, a disengageable device having oppositely disposed movable pressure plates therein one of which is connected to one of said pedals, an oblong pressure transmitting member between said pressure plates, means for shifting the pressure transmitting member to a lengthwise position to bridge the space between said pressure plates or to a crosswise position to leave the pressure plates free for independent movement, said pressure plates being curved to one side of the line of application of pressure to exert a camming action tending to maintain the pressure transmitting member in its longitudinal position, and the other of said pressure plates being connected to the brake mechanism.

4. In an automobile section which may be connected to an airplane section having lifting and control surfaces to form an airplane, the combination of a pair of foot pedals, a connection to the pedals for operating engagement with a control surface of the airplane section, a disengageable device having oppositely disposed movable pressure plates therein one of which is connected to one of said pedals, an oblong pressure transmitting member between said pressure plates, means for shifting the pressure transmitting member to a lengthwise position to bridge the space between said pressure plates or to a crosswise position to leave the pressure plates free for independent movement, said pressure plates being curved to one side of the line of application of pressure to exert a camming action tending to maintain the pressure transmitting member in its longitudinal position, means to guide said pressure transmitting member to a symmetrical position when in its crosswise position, and the other of said pressure plates being connected to the brake mechanism.

5. In an automobile section which may be connected to an airplane section having lifting and control surfaces to form an airplane, the combination of a pair of foot pedals, a connection to the pedals for operating engagement with a control surface of the airplane section, a disengageable device having oppositely disposed movable pressure plates therein one of which is connected to one of said pedals, an oblong pressure transmitting member between said pressure plates, means for shifting the pressure transmitting member to a lengthwise position to bridge the space between said pressure plates or to a crosswise position to leave the pressure plates free for independent movement, said pressure plates being curved to one side of the line of application of pressure to exert a camming action tending to maintain the pressure transmitting member in its longitudinal position, a pivoted lever to which the other of said pressure plates is connected, a brake applying element connected to said lever on the opposite side of said lever from its fulcrum, a hand brake member, and a cable connecting said hand brake member to the same side of said lever to which the brake applying element is connected.

ROBERT E. FULTON, Jr.
OCTAVIO JOSE ALVAREZ.

REFERENCES CITED

The following references are of record in the file of this patent:

UNITED STATES PATENTS

| Number | Name | Date |
|---|---|---|
| 1,662,306 | Fokker | Mar. 13, 1928 |
| 2,215,003 | Johnson | Sept. 17, 1940 |
| 2,241,577 | Beals, Jr. | May 13, 1941 |

FOREIGN PATENTS

| Number | Country | Date |
|---|---|---|
| 559,817 | Great Britain | Mar. 7, 1944 |